(12) United States Patent
Takahashi et al.

(10) Patent No.: US 6,273,632 B1
(45) Date of Patent: Aug. 14, 2001

(54) JOINT PIN LOCK MECHANISM FOR PIVOTAL PIN JOINT

(75) Inventors: Ei Takahashi, Tutchiura; Ryohei Suzuki, Yasato-machi; Toshio Hasegawa, Ibaraki-machi; Hiroshige Kurosaka, Minori-machi, all of (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 09/377,734

(22) Filed: Aug. 19, 1999

(30) Foreign Application Priority Data

Aug. 25, 1998 (JP) .................................................. 10-238142

(51) Int. Cl.[7] ................................. F16C 11/06; F16J 1/18
(52) U.S. Cl. .......................... 403/154; 403/150; 403/157; 403/155; 403/161; 403/163; 403/14
(58) Field of Search ..................................... 403/150, 152, 403/154, 157, 161, 163, 13, 14

(56) References Cited

U.S. PATENT DOCUMENTS

| | | | |
|---|---|---|---|
| 2,967,726 | * | 1/1961 | Weston ................................. 403/157 |
| 3,904,299 | * | 9/1975 | Loonis et al. ........................ 403/157 |
| 4,133,121 | * | 1/1979 | Hemphill ............................. 37/118 R |
| 4,243,341 | * | 1/1981 | Kabay et al. ......................... 403/158 |
| 4,400,898 | * | 8/1983 | Christensen et al. ................. 403/158 |
| 4,607,977 | * | 8/1986 | Varnelis et al. ...................... 403/154 |
| 5,024,283 | * | 6/1991 | Deli ..................................... 403/120 |
| 5,127,224 | * | 7/1992 | Barcza et al. ........................ 403/158 |

FOREIGN PATENT DOCUMENTS

| | | | | |
|---|---|---|---|---|
| 433693 | * | 9/1926 | (DE) . | |
| 2707593 | * | 8/1978 | (DE) | ..................................... 403/157 |
| 694467 | * | 9/1930 | (FR) | ..................................... 403/157 |
| 2524589 | * | 10/1983 | (FR) | ..................................... 403/14 |

* cited by examiner

Primary Examiner—Lynne H. Browne
Assistant Examiner—Ernesto Garcia
(74) Attorney, Agent, or Firm—Oblon, Spivak, McClelland, Maier & Neustadt, P.C.

(57) ABSTRACT

A joint pin lock system or mechanism for a pivotal pin joint which connects one mechanical structural member between a pair of bracket portions of another mechanical structural member pivotally relative to each other by means of a joint pin passed through a connecting end portion of one mechanical structural member and the bracket portions of the other mechanical structural member. For locking the joint pin in a fixed state at least in rotational directions, the joint pin lock mechanism includes a collar portion which is provided fixedly at and around one end of the joint pin and extended along the outer side of one bracket in a direction perpendicular to the axis of the joint pin, a locking slot which is formed in the collar portion in such a way as to have a longitudinal center line in an intersecting direction relative to a center line of the joint pin, a seating member which is securely fixed to the bracket, and an anti-rotation block which is fitted on the seating member for engagement in the locking slot of the collar portion. The anti-rotation block is substantially of a square shape having a width approximately same as that of the locking slot and a length shorter than that of the locking slot.

7 Claims, 11 Drawing Sheets

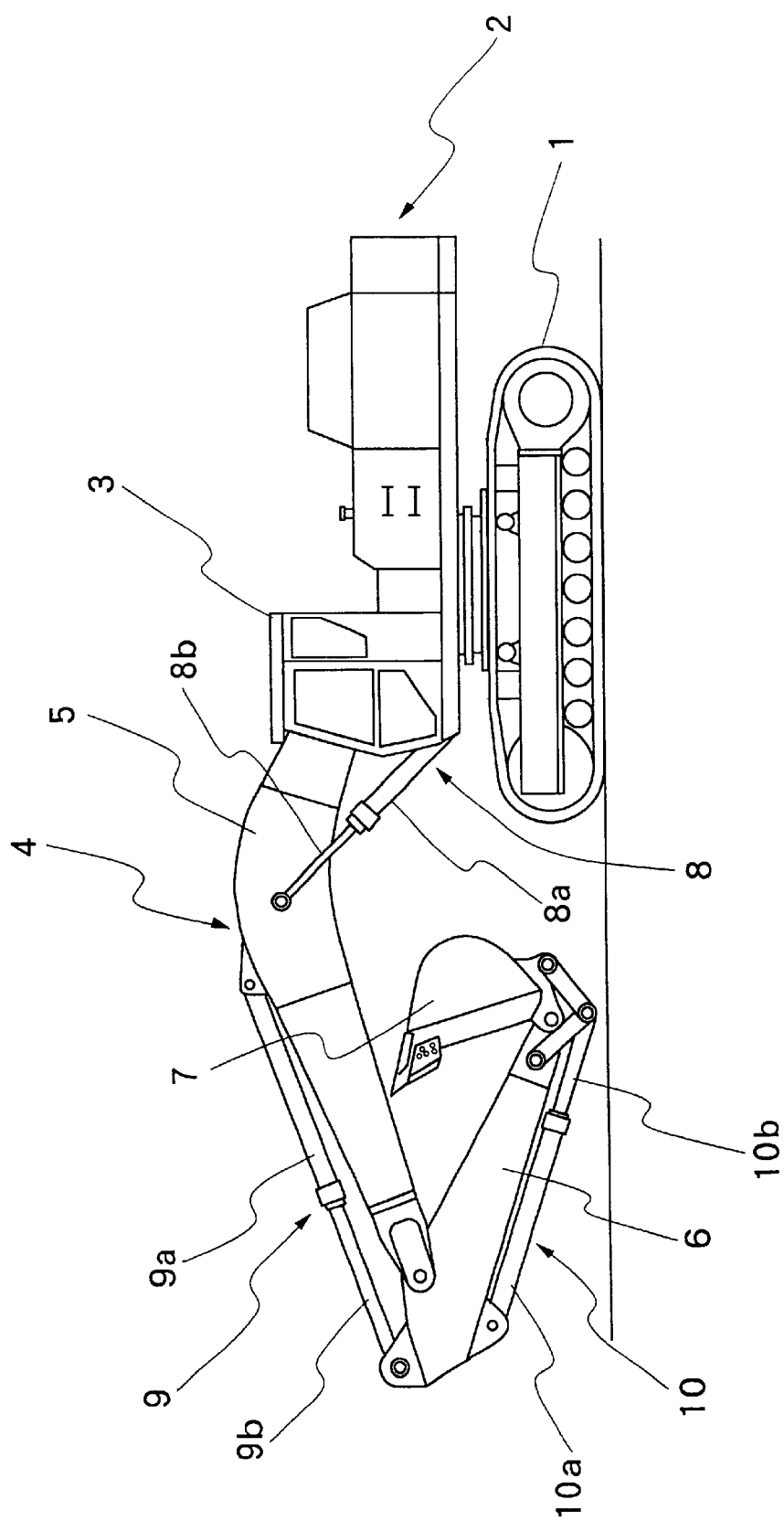
PRIOR ART FIG. 10

PRIOR ART FIG. 11
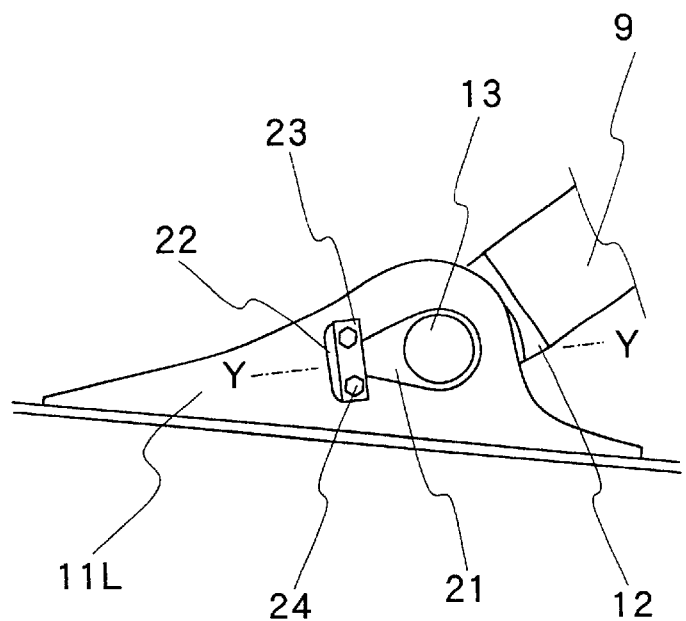
PRIOR ART FIG. 13
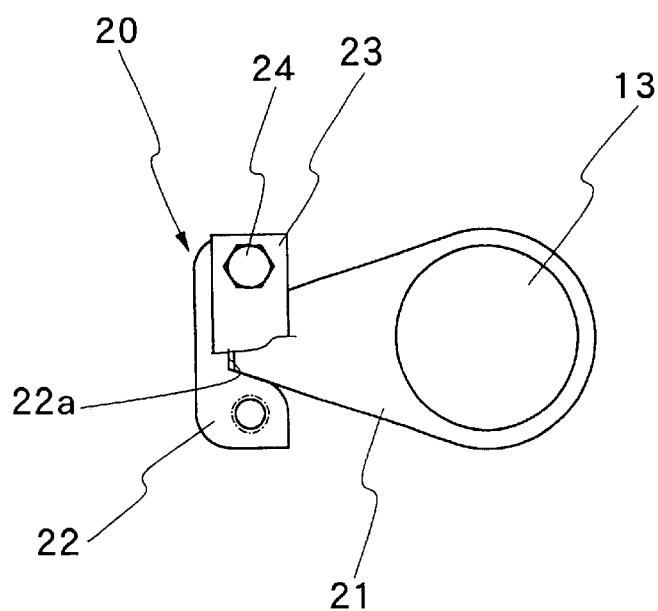

PRIOR ART FIG. 12
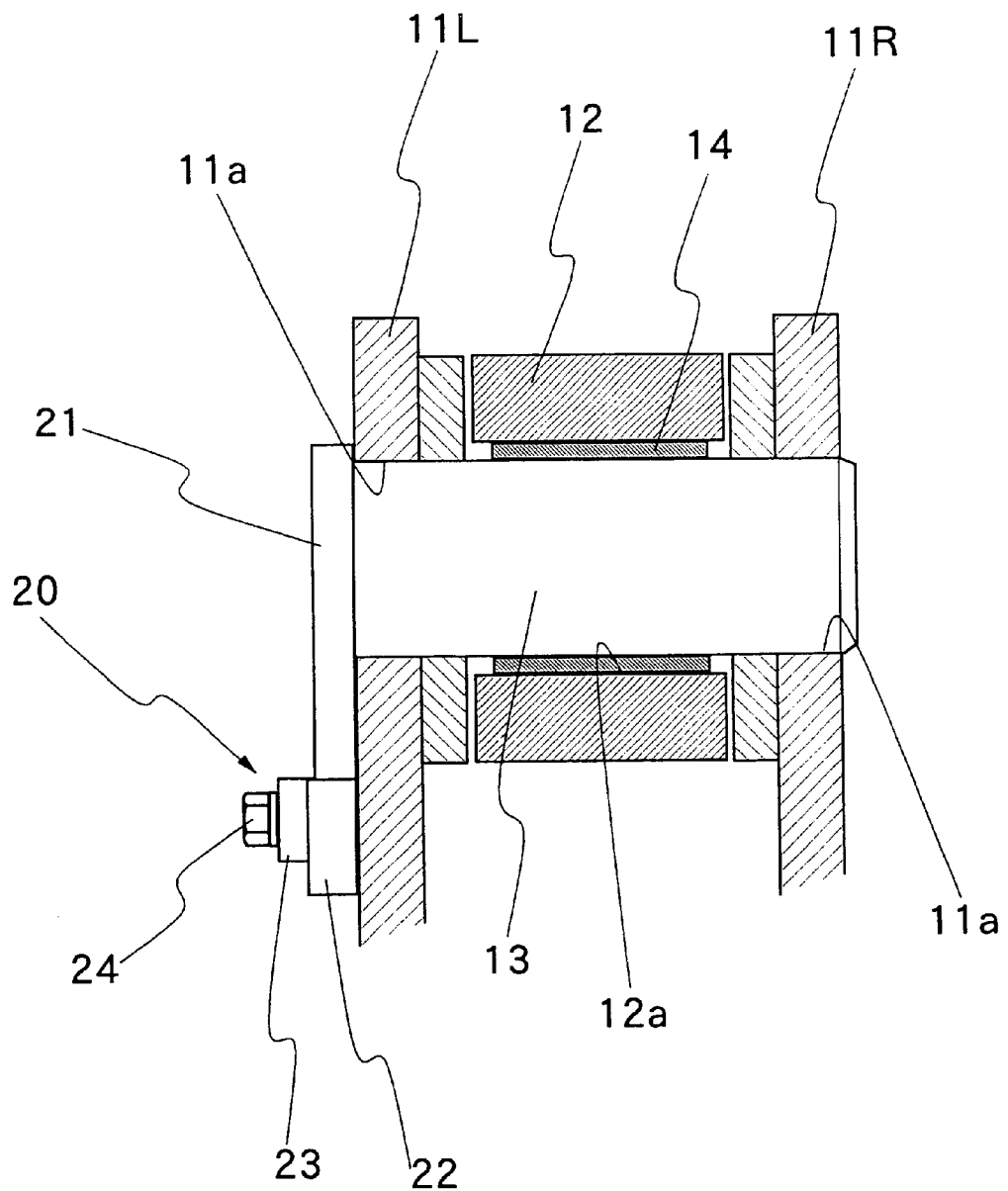

PRIOR ART FIG. 14
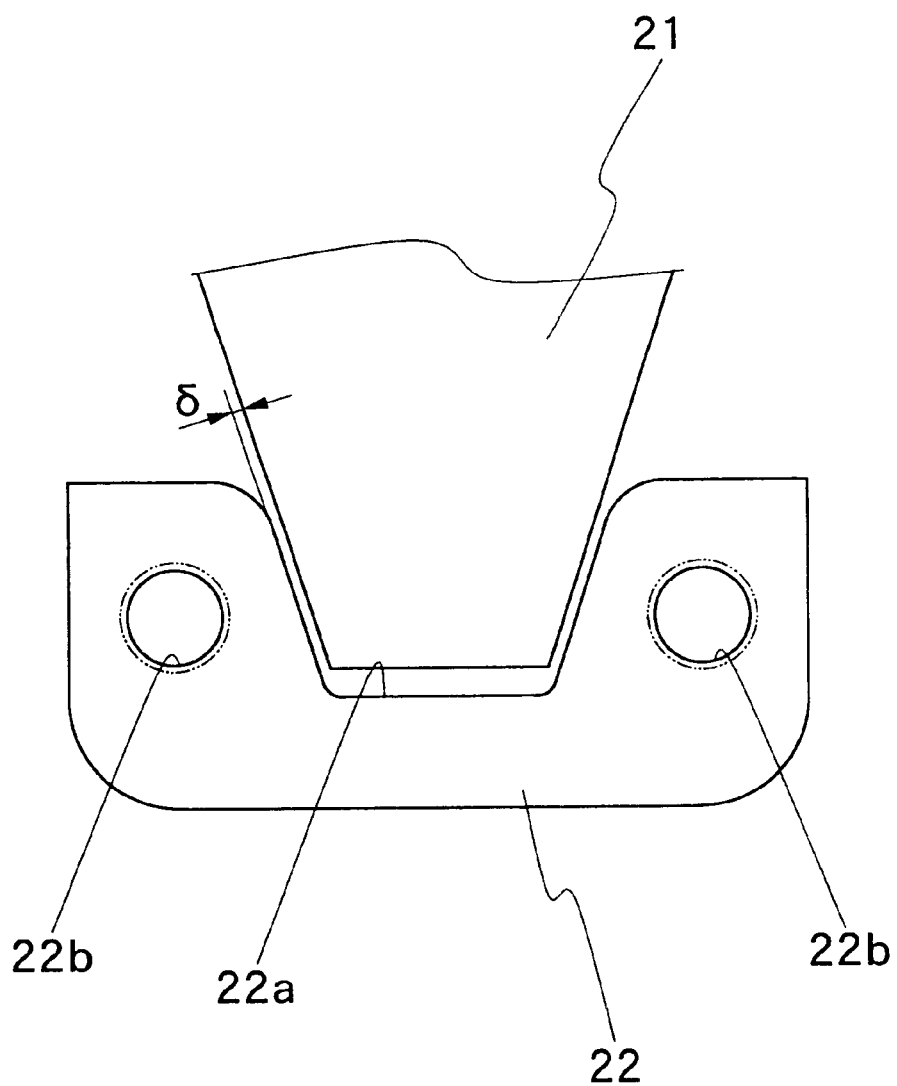

JOINT PIN LOCK MECHANISM FOR PIVOTAL PIN JOINT

BACKGROUND OF THE INVENTION

1. Field of the Art

This invention relates to a joint pin lock mechanism or system for use on a pivotal pin joint which connects a pair of mechanical structural members pivotally relative to each other through a joint pin, and more particular to a joint pin lock mechanism which can lock a joint pin securely and safely in position in a fixed state against undesired rotational movements and against spontaneous axial movements as well if necessary.

2. Prior Art

In the manufacture of machines such as construction machines, for instance, it has been well known to connect two mechanical structural parts through a pivotal pin joint to permit pivotal movements relative to each other. As for example, shown in FIG. 10 is a hydraulic power shovel which employs pivotal pin joints of this sort. Basically, the hydraulic power shovel is constituted by a vehicular body having a crawler type base carrier 1 and an upper rotary body 2 which is rotatably mounted on the base carrier 1. Provided on the upper rotary body 2 is an operator's cab 3 and a front working mechanism 4 which is arranged to do predetermined jobs. The front working mechanism 4 usually includes a boom 5 which is lifted up and down, an arm 6 which is pivotally connected to the fore end of the boom 5 for swinging movements in a vertical direction, and a front attachment, for example, a bucket 7 which is pivotally supported at the fore end of the arm 6.

In the case of a hydraulic power shovel as shown, normally hydraulic motors are employed for driving the vehicular base carrier 1 and for rotation of the upper rotary body 2. In addition, the front working mechanism 4 are driven by hydraulic cylinders 8 to 10. The boom 5 is lifted up and down by a boom operating cylinder 8 which is connected between the boom 5 and the upper rotary body 2. Namely, one end of a cylinder tube 8a of the boom operating cylinder is connected to the upper rotary body 2 and a rod 8b which is projected from the other end of the cylinder 8a is connected to the boom 5. A cylinder tube 9a of the arm cylinder 9 is connected to the boom 5, and a fore end portion of its rod 9b is connected to the arm 6. Further, a cylinder tube 10a of the bucket cylinder 10 is connected to the arm 6, and its rod 10b is connected to the bucket 7. In connecting the cylinders 8a to 10a and rods 8b to 10b of the respective drive cylinders 8 to 10 in this manner, two mechanical parts at each connecting point are connected through a pivotal pin joint which permits relative rotational movements of connected mechanical parts about a joint pin and also permits separation of the two connected parts upon extraction of the joint pin whenever necessary.

In this regard, Japanese Laid-Open Patent Application H6-300033 discloses a pivotal pin joint construction which connects hydraulic cylinders 8 to 10 rotatably relative to and separably from a cooperating mechanical part. Shown by way of example in FIGS. 11 to 14 is the just-mentioned prior art pivotal pin joint construction which is used to connect a cylinder tube 9a of an arm operating cylinder 9 to a boom 5.

More specifically, shown in FIGS. 11 and 12 are a schematic outer view of the prior art pivotal pin joint and a sectional view taken on line Y—Y of FIG. 11, respectively. In these figures, indicated at 11L and 11R are brackets which are securely fixed to the boom 5 by welding or other suitable means. Supported between the brackets 11L and 11R (hereinafter a common reference numeral "11" is used for the two brackets for the convenience of explanation) is a connecting portion 12 of the cylinder tube 9a of the arm operating cylinder 9. A joint pin 13 is passed across the two brackets 11 through the connecting portion 12 thereby to support the arm cylinder 9 pivotally relative to the brackets 11 on the part of the boom 5. For this purpose, pin receptacle holes 11a and 12a are formed in the bracket 11 and connecting portion 12, respectively. A bush 14 is fitted in the pin receptacle hole 12a for sliding contact with the joint pin 13.

As the arm cylinder 9 is actuated, the arm 6 is turned up or down relative to the boom 5 to vary the angle between the arm cylinder 9 and the boom 5. At this time, the connecting portion 12 is subject to a force which acts to turn the connecting portion forcibly about the joint pin 13. If the joint pin 12 is caused to turn relative to the brackets 11 under the influence of the forced rotation of the connecting portion, it will hinder smooth movement of the boom 5 and could result in accelerated wearing of the joint pin 13 itself. Therefore, in addition to prevention of axial movements of the joint pin 13 which might result in disengagement from the connecting portion 12 and brackets 11, it is necessary to prevent rotational movements of the joint pin 13 relative to the brackets 11.

In the particular case shown, a joint pin lock structure 20 is formed on the pivotal pin joint upon inserting the joint pin 13. The joint pin lock structure 20 includes a collar portion 21 which is securely fixed to the joint pin 13 by welding and extended in a direction perpendicular to the axis of the joint pin 13. The just-described collar portion 21 function to lock the joint pin 13 in a fixed state in both rotational and axial directions.

In order to fix the collar portion 21 in position, a U-shaped anti-rotation plate 22 is securely fixed on the outer side of one of the paired brackets 11, for example, on the outer side of the bracket 11L, and the extended end of the collar portion 21 is arrested in a recess 22a of the U-shaped anti-rotation plate 22. By engagement of the collar portion 21 with the U-shaped anti-rotation plate 22, the joint pin 13 which is connected with the collar portion 21 is blocked against rotational movements. Further, the joint pin 13 is locked against movements in the axial direction by a stopper plate 23 which is provided with apertures (not shown) and fixed on the rotation blocking plate 22 by threading screws into screw holes in the rotation blocking plate 22 through apertures in the stopper plate 23.

The pin receptacle hole 11a is bored into the bracket 11L, and the anti-rotation plate 22 is fixed to the bracket 11, for example, by welding, in separate stages of a fabrication process. Consequently, difficulties are often encountered in fixing the anti-rotation plate 22 in position with strict accuracy relative to the center of the pin receptacle hole 11a, due to errors occurring under the influence of the heat of welding operation or errors occurring in a machining stage. In order to engage the fore end of the collar portion 21 of the joint pin 13 in the recess 22a of the anti-rotation plate 22 without failure despite such positioning or dimensional errors, it is necessary to form the recess 22a in a broader width as compared with that of the collar portion 22, providing a play or adjustment gap spaces δ on the opposite sides thereof to absorb possible dimensional or positioning errors when the collar portion 22 is placed in the recess 22a. In this manner, arrangements have to be made to ensure that the collar portion 21 can be fitted in the recess 22a without failure despite positional deviations of the anti-rotation plate 22 relative to the pin receptacle hole 11a.

As described above, it is inevitable to provide adjustment gaps 2δ between the recess 22a of the anti-rotation plate 22 and the collar portion 21 to compensate for errors in fabricating or machining stages although the anti-rotation function is impaired to a degree which corresponds to the width of the adjustment gaps 2δ. Besides, as the connecting portion 12 is turned repeatedly relative to the bracket 11L, the collar portion 21 is each time collided against wall surfaces of the recessed portion 22a of the anti-rotation plate 21. This eventually causes deformations and damages to the anti-rotation plate 22 and the collar portion 21 and as a result broadens the gap spaces to further deteriorate the anti-rotation function of the pin lock mechanism and accelerate wearing of the anti-rotation plate 22.

SUMMARY OF THE INVENTION

In view of the foregoing situations, it is an object of the present invention to provide a joint pin lock mechanism or system for a pivotal pin joint of the sort as described above, which can block a collar portion of a joint pin in a fixed state against rotational movements in a secure manner without entailing damages to or accelerated or premature wearing of locking parts.

It is another object of the present invention to provide a joint pin lock mechanism for a pivotal pin join, which can lock a joint pin in a fixed state against rotational movements in a reliable manner by eliminating redundant gap spaces between a collar portion of a joint pin and an anti-rotation block member.

It is still another object of the present invention to provide a joint pin lock mechanism for a pivotal pin joint, which can preclude adverse effects of positional deviations or positioning or dimensional errors which might occur to a locking part or parts in a welding stage or in the course of fabrication of the locking mechanism.

It is a further object of the present invention to provide a joint pin lock mechanism for a pivotal pin joint, which can improve the durability of a joint pin and of the pin lock mechanism itself.

In accordance with the present invention, for achieving the above-stated objectives, there is provided a joint pin lock mechanism for a pivotal pin joint which pivotally connects one end of a mechanical structural member between a pair of bracket portions of another mechanical structural member through a joint pin. For locking a joint pin in a fixed state at least against movements in rotational directions, the joint pin lock mechanism comprises: a collar portion provided fixedly at and around one axial end of the joint pin and extended along and on the outer side of one of the paired bracket portions in a direction perpendicular to the axis of the joint pin; a locking slot formed in the collar portion in predetermined length and width and having a longitudinal center line extended in a direction perpendicularly intersecting the axis of the joint pint; a seating member fixedly attached on the outer side of the one bracket; and an anti-rotation block member rotatably supported on the seating member for engagement in the locking slot in the collar portion, the anti-rotation block being substantially rectangular in shape and having a width substantially same as that of the locking slot and a length shorter than that of the locking slot.

In this instance, the anti-rotation block which has its opposite lateral sides in abutting engagement with longitudinal inner surfaces of the locking slot is tiltably fitted on a cylindrical body portion of the seating member. Preferably, the seating member is provided with a flange portion of a large diameter at one axial end of the cylindrical body portion and fixedly welded to the outer side of one bracket portion by way of that flange portion. Further, preferably, the anti-rotation block is formed substantially in the same thickness as the collar portion of the joint pin.

In order to lock the joint pin against movements in both rotational and axial directions, a stopper plate is fixed on the outer side of the collar portion. The stopper plate is preferably of a annular disc-like shape having an outside diameter larger than the width of the locking slot, and detachably fixed to the seating member by a screw along with the anti-rotation block.

The above-mentioned bracket portions can be, for example, a pair of brackets which are provided on a load lifting structural member, and the first mentioned mechanical structural member can be a hydraulic cylinder, more specifically, a connecting portion of a cylinder tube.

The above and other objects, features and advantage of the present invention will become apparent from the following particular description, taken in conjunction with the accompanying drawings which show by way of example a preferred embodiment of the invention. Needless to say, it is to be understood that the present invention is not restricted particular forms shown in the drawings.

BRIEF DESCRIPTION OF THE DRAWINGS

In the accompanying drawings:

FIG. 10 is a schematic outer view of a hydraulic power shovel, shown as one example of a machine to which the joint lock structure is applicable;

FIG. 11 is a schematic front view of a conventional joint pin lock structure at a pivotal joint of an arm cylinder of a hydraulic power shovel;

FIG. 12 is an enlarged sectional view taken on line Y—Y of FIG. 11;

FIG. 13 is a schematic illustration of the conventional joint pin lock structure, showing the manner in which a collar portion of a joint pin is locked in position by an anti-rotation plate and a stopper plate; and FIG. 14 is a schematic illustration, showing the manner in which a fore end portion of the collar portion is engaged with a recessed portion of the anti-rotation member.

DESCRIPTION OF PREFERRED EMBODIMENTS

Figure 1:
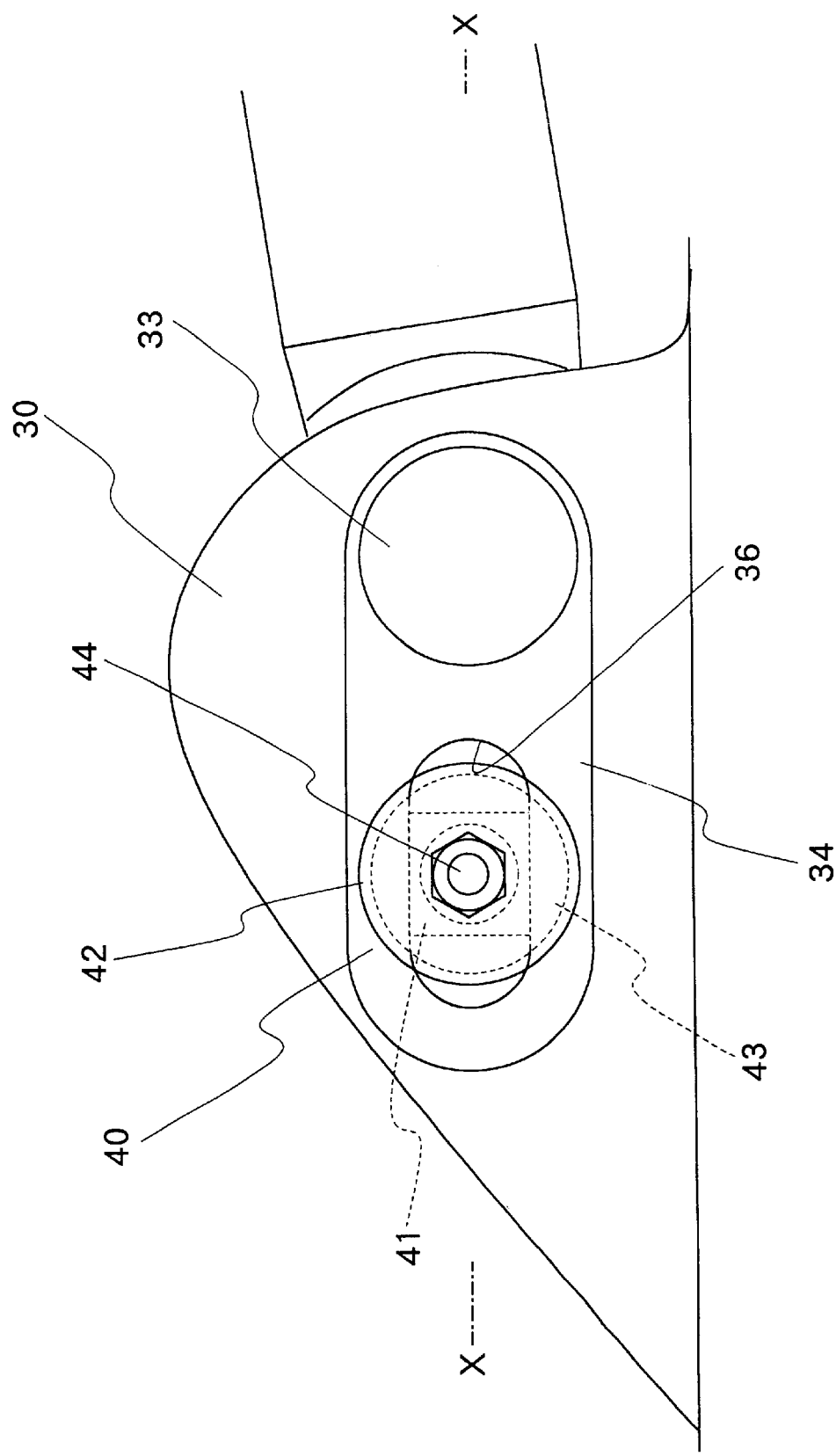
FIG. 1 is a schematic front view of a joint pin lock mechanism according to an embodiment of the present invention.
Figure 2:
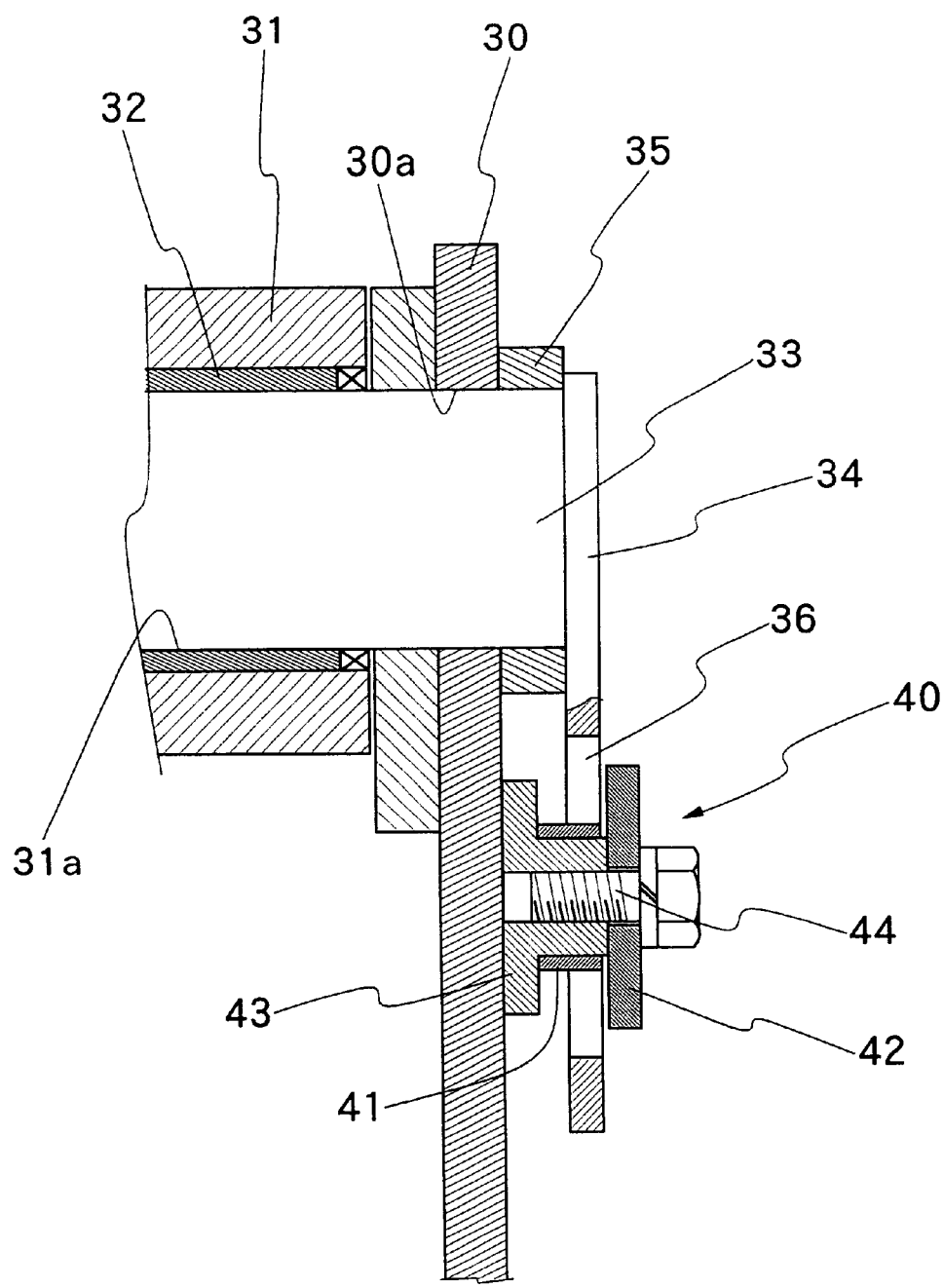
FIG. 2 is a schematic sectional view taken on line X—X of FIG. 1.

Hereafter, the present invention is described more particularly by way of its preferred embodiment with reference to FIGS. 1 through 9. Firstly, shown in FIGS. 1 and 2 is a joint pin lock mechanism, in which indicated at 30 a pair of brackets (only one of which is shown in the drawings) which serve as an outer connecting member of a pivotal pin joint. Located between the paired brackets 30 is an inner connecting member 31 of the pivotal pin joint. In this instance, the brackets 30 are securely fixed, for example, on a boom of a hydraulic power shovel, by welding or other suitable means to provide a pivotal joint for an arm operating cylinder. In that case, the inner connecting member 31 represents a base end portion of a cylinder tube of the arm operating cylinder.

Bored transversely through the brackets 30 and inner connecting member 31 are pin receptacle holes 30a and 31a in which a joint pin 33 is fitted along with a bush 32. The joint pin 33 is provided with a locking collar portion 34 which is extended in a direction perpendicular to the axis of the joint pin. The just-described pivotal pin joint construction is a conventional one and has no differences in particular from the prior art pivotal pin joint construction described hereinbefore. Besides, a reinforcing plate 35 is attached to an outer side of the bracket 30.

In this case, however, the pivotal pin joint is provided with a pin locking mechanism 40 which functions to lock the collar portion 34 of the joint pin 33 fixedly and securely in a predetermined position on the outer side of one bracket 30. The joint pin locking mechanism 40 is constituted by an anti-rotation block 41 and an outer stopper plate 42. These anti-rotation block 41 and stopper plate 42 are detachably fixed to a seating member 43 which is fixedly provided on the bracket 30.

The anti-rotation block 41 functions to block rotational movements of the collar portion 34 of the joint pin 33. To this end, the anti-rotation block 41 is received in a slot 36, which is bored through the collar portion 34, with lateral sides of the anti-rotation block 41 in abutting engagement with inner longitudinal wall surfaces of the slot 36 of the collar portion 34. On the other hand, the stopper plate 42 function to block axial movements of the joint pin 33. For this purpose, the stopper plate 42 is either abutted against the outer surface of the collar portion 34 or fixed in a position on the outer side of the latter face to face in small gap relation therewith. Besides, an outer end portion of the joint pin 33 which is projected through and on the outer side of the bracket 30 is circumvented by a reinforcing plate 35 which is in abutting engagement with the collar portion 34 of the joint pin 33. As a result, the collar portion 34 of the joint pin 33 is securely blocked against movements in the axial direction or against movements in a direction toward or away from the bracket 30.

Figure 3:
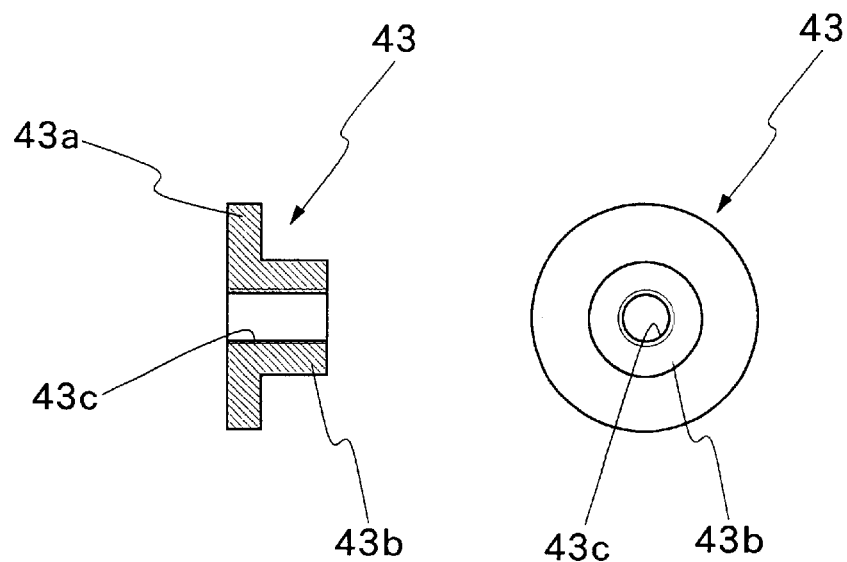
FIG. 3 shows a screw seat member in schematic sectional and front views.
Figure 4:
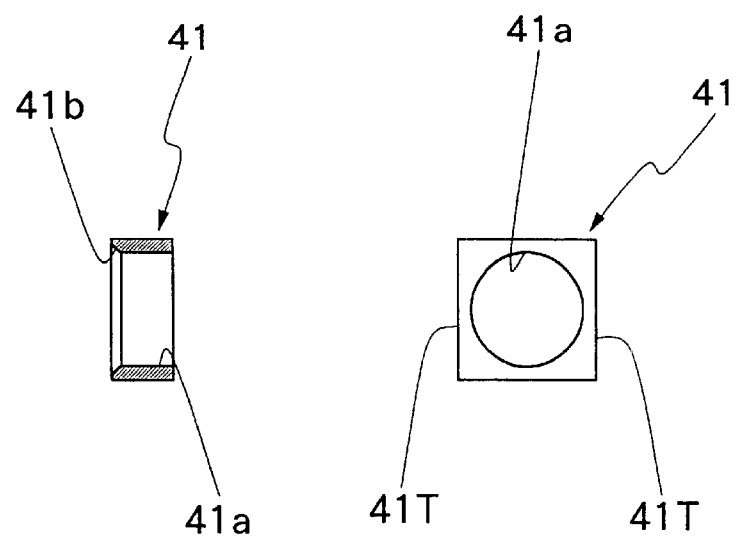
FIG. 4 shows a blocking member in schematic sectional and front views.
Figure 5:
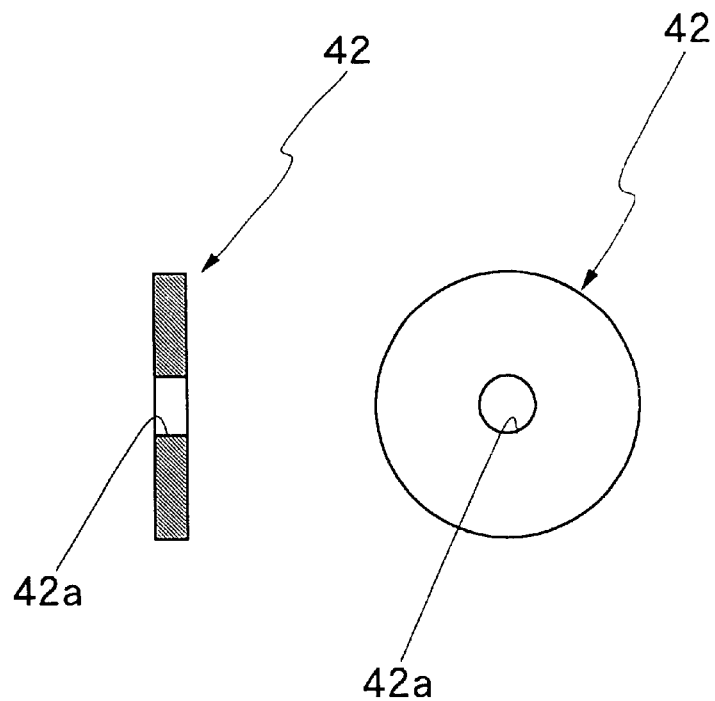
FIG. 5 shows a stopper plate in schematic sectional and front views.
Figure 7:
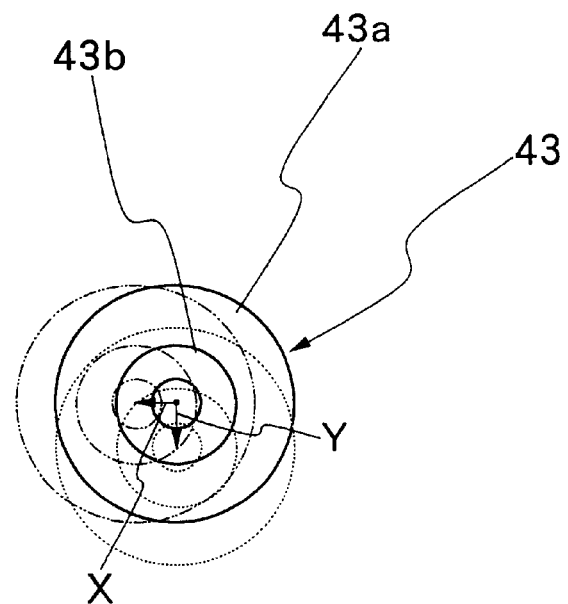
FIG. 7 is a schematic illustration explanatory of positional deviations from an initially mounted position of the screw seat member and its functions.

Shown in FIGS. 3 to 5 are the seating member 43, the anti-rotation block 41 and the outer stopper plate member 42 in sectional and front views, respectively.

Firstly, the seating member 43 is securely fixed to the outer side of the bracket 30 by welding at its flange portion 43a of an increased diameter which is provided at one end of its cylindrical body 43b. The flange portion 43a of the seating member 43 is formed in a circular shape so that it can be welded in position more easily as compared with a seat member in square or other shapes. The outside diameter of the flange portion 43a of the seating member 43 is larger than the width of the slot 36 in the collar portion 34, while the outside diameter of its cylindrical body portion 43b is smaller than the width of the slot 36. Further, the aperture 41a in the anti-rotation block 41 is so dimensioned as to tightly fit on the cylindrical body 43b of the seating member 43. Edges at one axial end of the aperture 41a are tapered off to provide a tapered guide surface 41b which guide and urges the aperture 41a of the anti-rotation block 41 smoothly into fitting engagement with the cylindrical body portion 43b of the seating member. The thickness of the anti-rotation block 41 approximately corresponds to the length of the cylindrical body portion 43b of the seating member 43. The outside diameter of the stopper plate 42 is larger than the width of the slot 36 in the collar portion 34, and its inside diameter which is determined by the aperture 42a is larger than the shaft portion of the screw 44 and smaller than the outside diameter of the cylindrical body portion 43b of the seating member 43.

The mechanical connecting member 31 is pivotally connected to the bracket 30 by the joint pin 33 which is associated with the joint pin lock mechanism 40 of the construction as described above. More specifically, for this purpose, while the pin receptacle holes 30a and 31a in the bracket 30 and the connecting member 31 are being held in alignment with each other, the joint pin 33 is inserted into the holes 30a and 31a from the side of the bracket 30. As soon as soon as the fore distal end of the joint pin 33 reaches and comes out through the hole in the opposite bracket, the cylindrical body portion 43b of the seating member 43, which is welded to the bracket 30, is brought into fitting engagement with the slot 36 which is formed in the collar portion 34. Then, the anti-rotation block 41 is fitted on the cylindrical body portion 43b of the seating member 43 within the slot 36. At this time, the lateral surfaces of the anti-rotation block 41 are either abutted against or held in small gap relation with longitudinal inner surfaces of the slot 36. Further, the stopper plate 42 is fixed on the outer side of the anti-rotation block 41 and the collar portion 34 by threading the screw 44 into the seating member 43. As a result, the joint pin lock mechanism 40 is assembled into the pivotal pin joint.

When the joint pin 33 is assembled into position through the joint pin lock mechanism 40 as described above, it is locked securely and stably in position against forces which would act on the joint pin and tend to move the joint pin 33 in axial or rotational directions during operation of the hydraulic cylinder. More specifically, since the anti-rotation block 41 which is fixed to the bracket 30 through the seating member 43 is held in abutting engagement with longitudinal inner surfaces of the slot 36 of the collar portion 34, the forces which tend to rotate the joint pin 33 about its axis are supported by the anti-rotation block 41 and the bracket 30 through the seating member 43, and the joint pin 33 is prevented from moving spontaneously in the rotational direction. In this instance, although the anti-rotation block 41 is movable in the rotational direction relative to the seating member 43, there is no possibility of the anti-rotation block 41 being rotated by a force acting thereto through the collar portion 34. This is because the center of rotation of the anti-rotation block 41 is located in a different position from that of the collar portion 34. Accordingly, the anti-rotation block 41 is fixedly retained in a predetermined position within the slot 36, and the collar portion 34 is locked in a fixed state in the rotational direction.

On the other hand, since the inner and outer sides of collar portion 34 of the joint pin 33 are held in abutting engagement with the reinforcing plate 35 and the stopper plate 42, respectively, the joint pin 33 is blocked against movements in the axial direction. Thus, the joint pin 33 is stably and securely held in a locked state against movements in both rotational and axial directions simply by tightening the one and single screw 44. It follows that, whenever necessary, the joint pin 33 can be separated from the bracket 30 and the connecting member 31 simply by removing one screw 44. That is to say, the joint pin lock mechanism can be assembled into or disassembled from a pivotal pin joint in an extremely easy manner.

Figure 6:
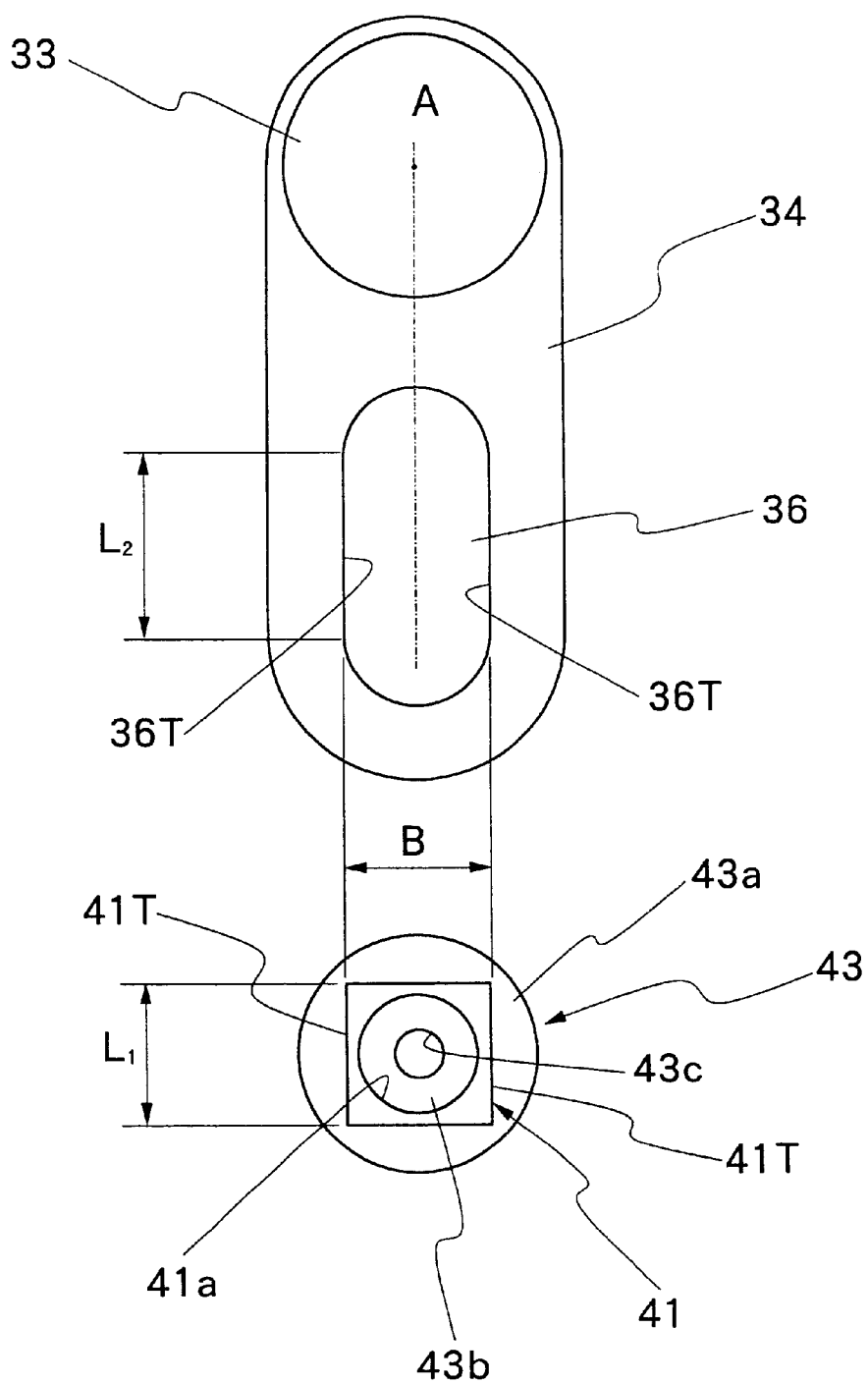
FIG. 6 is a schematic illustration explanatory of dimensional relations between a slot in a collar portion with the blocking member.
Figure 8:
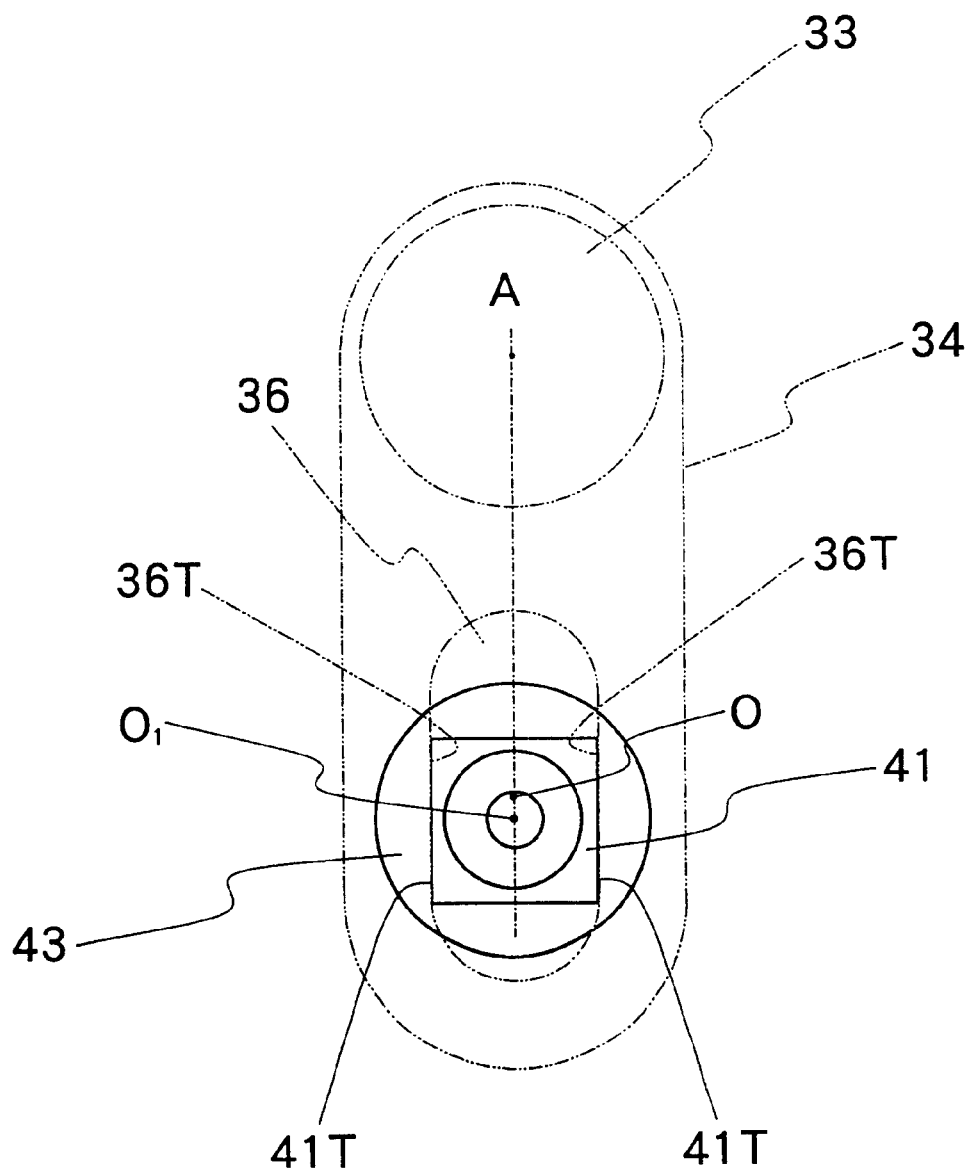
FIG. 8 is a schematic illustration explanatory of functions at the connection of the blocking plate member with the collar portion when the screw seat is deviated in Y-direction.

As shown in FIG. 6, the anti-rotation block 41, which functions as a mechanism for fixing the joint pin 33 in rotational directions, is formed substantially in the same width B as the slot 36 of the collar portion 34 so that the opposite lateral sides 41T of the anti-rotation block 41 are held in abutting engagement with the opposing inner wall surfaces 36T of the slot 36 when received in the latter. By forming the anti-rotation block 41 substantially in the same width as the slot 36 in this manner, rotational movements of the joint pin 33 can be prevented almost completely. In this regard, since the lateral surfaces 41T of the anti-rotation block 41 are each abutted against the inner wall surface 36T of the slot 36 over a relatively broad area, the surface pressure per unit area can be reduced to a low level which will contribute to suppression of wear or deformations of these parts and to prolonged service life of the lock mechanism.

In addition, a boring operation for the pin receptacle hole 30a in the bracket 30 is carried out separately from a welding operation for the seating member 43 which supports the anti-rotation block 41. Therefore, it is difficult to fabricate these parts strictly according preset relative positional relations. Especially, even if the position of the seating member 43 relative to the pin receptacle hole 30a is strictly controlled at the time of welding same to the bracket 30, its actually welded position could be deviated from a predetermined position to some extent under the influence of welding heat or for other reason.

Therefore, as shown in FIG. 6, the slot 36 is arranged such that its longitudinal center line A is disposed perpendicularly to the axis of the joint pin 33. Besides, the length L1 of the lateral sides 41T of the anti-rotation block 41 is made shorter than the length L2 of the straight side portions 36T of the slot 36 to be held in abutting engagement with the lateral sides 41T of the anti-rotation block 41. Therefore, even if the seating member 43 is deviated from a true position which is indicated by solid line in FIG. 7, more specifically, even if a welded position of the seating member 43 is deviated either in a vertical direction (in Y-direction) as indicated by broken line or in a lateral direction as indicated by two-dot chain line or in both X- and Y-directions, the lateral sides 41T of the anti-rotation block 41 can always be assembled into the slot 36 with its lateral sides 41T in surface contact with the longitudinal inner surfaces 36T of the slot 36.

When the seating member 43 is deviated in Y-direction relative to the pin receptacle hole 30a in the bracket 30, namely, when the center of the welded seating member 41 is located at O1 which is deviated from a true position O, the positions of abutting engagement of the lateral sides 41T of the anti-rotation block 41 with the longitudinal inner surfaces 36T of the slot 36 are simply shifted in the direction of the center line A of the slot 36. As long as the positional deviation of the seating member 43 relative to the pin receptacle hole 30a is within a difference between the lengths L1 and L2, the anti-rotation block 41 can be operatively retained in surface contact with the slot 36.

Figure 9:
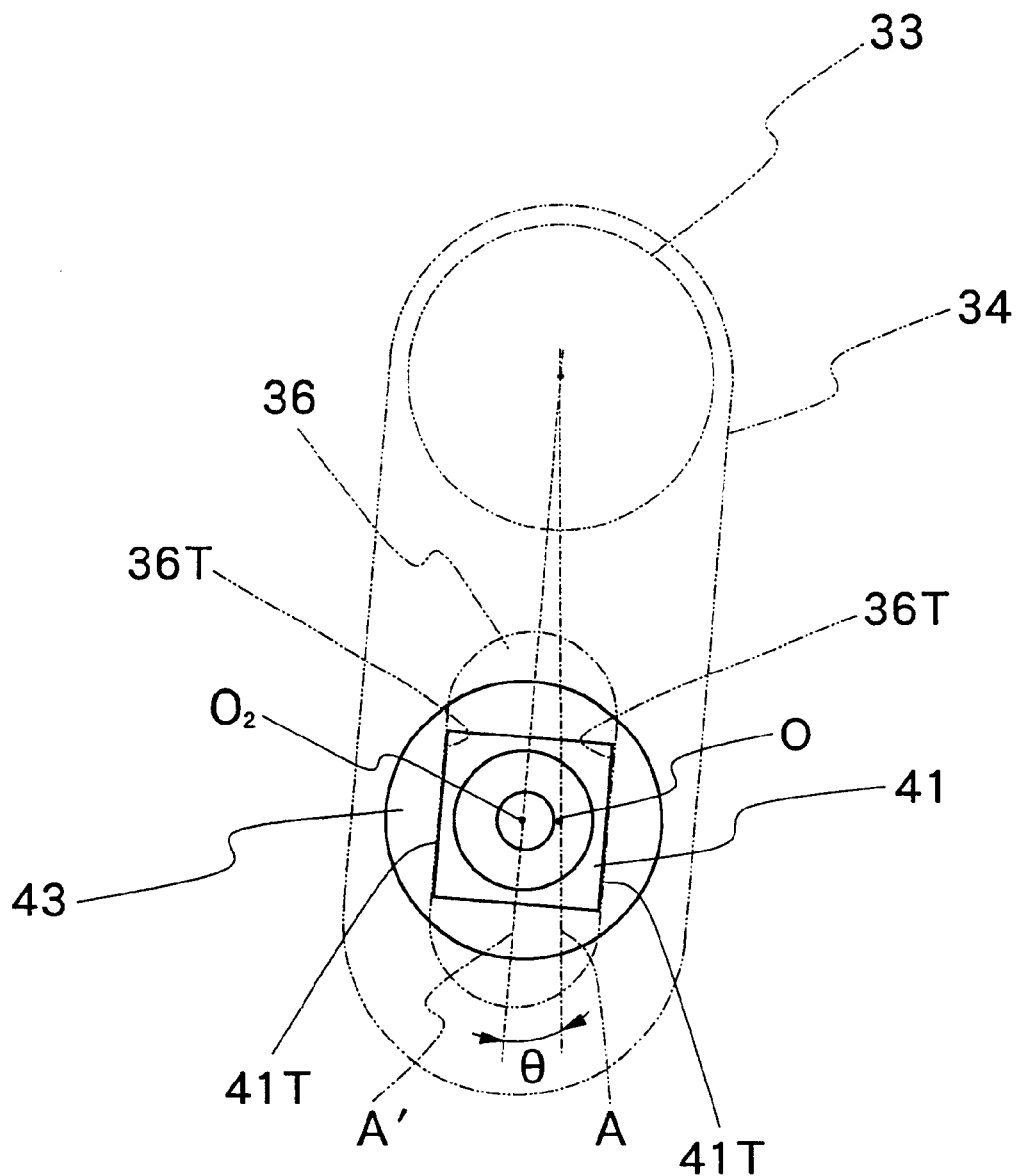
FIG. 9 is a schematic illustration explanatory of functions at the connection of the blocking plate member with the collar portion when the screw seat is deviated in X-direction.

On the other hand, when the center of the seating member 43 is deviated to O2 in Y-direction as shown particularly in FIG. 9, a line A' which connects the centers of the joint pin 33 and the seating member 43 is inclined through an angle θ from the normal position of the center line A of the slot 36. In this case, since the anti-rotation block 41 on the seating member 43 can be turned into an arbitrary direction, it can be easily turned into the direction of the inclined line A' and operatively assembled into position with its lateral sides 41T also inclined in the direction of the shifted center line A'. Accordingly, relative positional relations between the anti-rotation block 41 and the slot 36 are not influenced by inclination of the center line A, and the lateral sides 41T of the anti-rotation block 41 can be operatively held in abutting engagement with the longitudinal inner surfaces 36T of the slot 36 despite the positional deviation.

Thus, even if the position of the seating member 43 is deviated in the course of a welding operation under the influence of heat, it will not affect contacting conditions of the anti-rotation block 41 with the collar portion 34. Therefore, the seating member 43 can be fixed in position in an extremely facilitated manner. This means that there is no necessity any longer for providing gap spaces between the lateral sides 41T of the anti-rotation block 41 and the longitudinal inner surfaces 36T of the slot 36 for the purpose of absorbing positional deviations which might occur to the seating member 43 in the fabrication process. Namely, despite positional deviations of the seating member 43, the anti-rotation block 41 and the slot 36 can always be held in surface contact with each other in predetermined dimensional relations.

What is claimed is:

1. A pivotal pin joint for connecting one end of a mechanical structural member between a pair of bracket portions of another mechanical structural member, comprising:

a joint pin configured to be passed across the bracket portions through said mechanical structural member; and a joint pin lock mechanism configured to lock said joint pin in a fixed state at least against movements in rotational directions, said joint pin lock mechanism comprising:

a collar portion provided fixedly at and around one axial end of said joint pin and configured to be extended along and on an outer side of one of the bracket portions in a direction perpendicular to an axis of said joint pin;

a locking slot formed in said collar portion in predetermined length and width and having a longitudinal center line extended in a direction perpendicular intersecting said axis of said joint pin;

a seating member configured to be fixedly attached on the outer side of the one of the bracket portions; and an anti-rotation block member rotatably supported on said seating member for engagement in said locking slot in said collar portion, said anti-rotation block member being rectangular in shape and having a width substantially same as that of said locking slot and a length shorter than that of said locking slot.

2. A pivotal pin joint as defined in claim 1, wherein said anti-rotation block is substantially of a square shape and provided with an aperture fitted on a cylindrical body portion of said seating member.

3. A pivotal pin joint as defined in claim 2, wherein said seating member is provided with a flange portion at one end of a cylindrical body portion and configured to be fixedly welded to the one of the bracket portions at said flange portion.

4. A pivotal pin joint as defined in claim 2, wherein said aperture of said anti-rotation block is tightly fitted on said cylindrical body portion of said seating member and said aperture has edge portions tapered off on a side and said aperture is initially fitted on said cylindrical body portion of said seating member.

5. A pivotal pin joint as defined in claim 1, wherein said anti-rotation block and said collar portion of said joint pin have a thickness substantially the same.

6. A pivotal pin joint as defined in claim 1, further comprising a stopper plate fixedly attached to the outer side of said collar portion in abutting engagement with surfaces of the collar portion to block axial movements of said joint pin.

7. A pivotal pin joint as defined in claim 6, wherein said stopper plate is of an annular disc shape having an outside diameter larger than the width of said locking slot and detachably fixed to said one bracket portion along with said anti-rotation block.

* * * * *